United States Patent [19]

Dubois et al.

[11] 4,222,888
[45] Sep. 16, 1980

[54] LIQUID CRYSTAL MATERIALS CONTAINING A DIPHENYLETHANE NUCLEUS

[75] Inventors: Jean-Claude Dubois; Tinh H. Nguyen; Annie Zann, all of Paris, France

[73] Assignee: Thomson-CSF, Paris, France

[21] Appl. No.: 35,718

[22] Filed: May 3, 1979

[30] Foreign Application Priority Data

May 30, 1978 [FR] France ................ 78 13519

[51] Int. Cl.$^2$ .............. C07C 69/84; C07C 121/75; C09R 3/34
[52] U.S. Cl. .................. 252/299; 260/465 D; 350/350 R; 560/65; 568/331
[58] Field of Search ......... 260/465 D; 560/65, 108; 252/299

[56] References Cited

U.S. PATENT DOCUMENTS

| | | | |
|---|---|---|---|
| 3,862,211 | 1/1974 | Havinga et al. | 560/108 |
| 4,035,056 | 7/1977 | Coates et al. | 252/299 X |
| 4,110,243 | 8/1978 | Abert-Mellah et al. | 260/465 D |
| 4,112,239 | 9/1978 | Dubois et al. | 560/108 |
| 4,147,655 | 4/1979 | Dubois et al. | 252/299 |

FOREIGN PATENT DOCUMENTS

2544577 6/1976 Fed. Rep. of Germany .
2347427 4/1977 France .

*Primary Examiner*—Dolph H. Torrence
*Attorney, Agent, or Firm*—Oblon, Fisher, Spivak, McClelland & Maier

[57] ABSTRACT

Novel mesomorphic substances, constituting, in certain temperature ranges, nematic or smectic liquid crystals which are compounds of the formula:

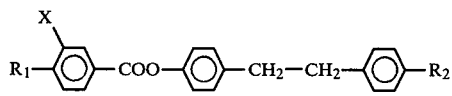

wherein
$R_1$ is an alkoxy group containing 1 to 10 atoms of carbon;
$R_2$ is an alkyl group containing 1 to 10 atoms of carbon;
X is Br or CN.

5 Claims, No Drawings

LIQUID CRYSTAL MATERIALS CONTAINING A DIPHENYLETHANE NUCLEUS

The invention concerns a family of liquid crystal materials exhibiting relatively high negative dielectric anisotropy and various structures of the nematic or smectic type. Mixtures of the same with other liquid crystal materials belong to the invention.

It aims to obtain compounds of better stability, as liquid crystal materials, than analogous compounds.

According to the invention there is provided liquid crystal materials comprising at least one compound of the formula:

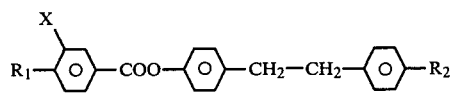

wherein:
$R_1 = C_n H_{2n+1} O$, n being an integer from 1 to 10;
$R_2 = C_m H_{2m+1}$, m being an integer from 1 to 10 and
$X = Br$ or $CN$.

Hereinafter are given the general process for manufacturing these substances: examples of the operational method concerning the different steps of synthesis, and finally the mesomorphic properties of some of these materials and of mixtures of these materials according to the invention with a known mesomorphic substance.

General process for manufacturing a liquid crystal material according to the invention (a) para-substituted phenol is synthesised starting from para-methoxyphenylacetic acid chloride. The process comprises three steps:

Step 1.1.: A Friedel and Crafts' reaction is carried out between said acid chloride and an alkylbenzene or bromobenzene:

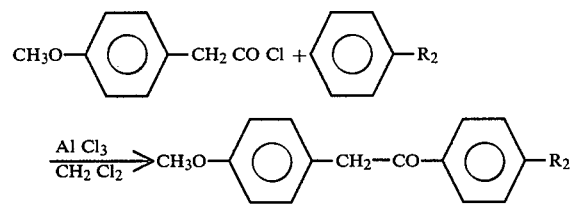

Step 1.2: the product obtained in the preceding step is demethylated:

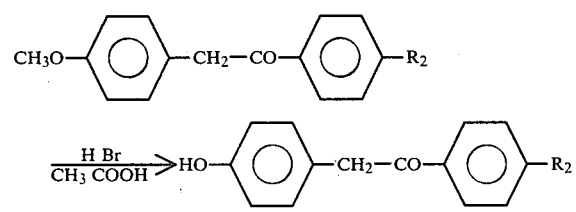

Step 1.3: the product obtained in the preceding step is reduced by the Wolff-Kishner reaction

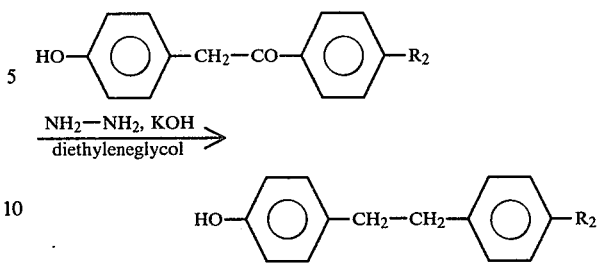

The para-substituted phenol thus obtained is 4-hydroxy-4'-alkyl-phenylethane or 4-hydroxy-4'-bromo-phenylethane.

(b) the chloride of a meta-substituted p-alkoxy benzoic acid is synthesised with bromine as a substituent. The process is as follows:

Step 2.1: a bromination of a p-alkoxy benzoic acid is carried out:

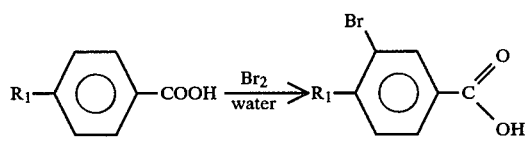

Step 2.2: starting from the acid obtained in the preceding step, the chloride of the acid is synthesised in a conventional manner:

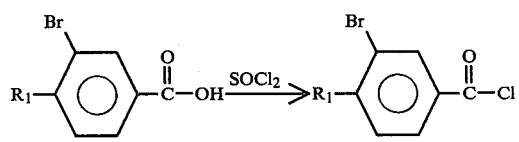

(c) the chloride obtained in step 2.2 hereabove is esterified by the parasubstituted phenol obtained in step 1.3:

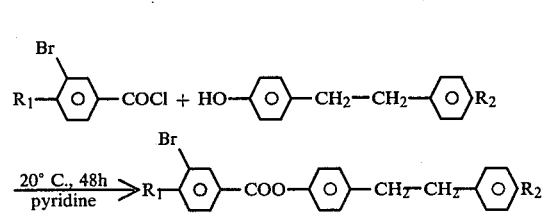

This is a compound according to the invention, wherein:
$X = Br$.

(d) in order to obtain another compound according to the invention wherein:
$X = C \equiv N$.

Starting from the compound obtained in the preceding stage (c) hereabove, CN is substituted in the first nucleus for Br, in a conventional manner;

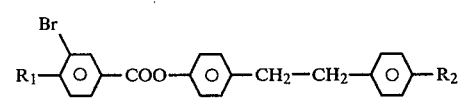

-continued

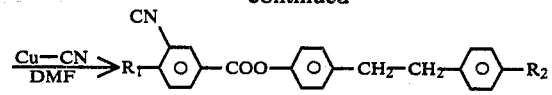

wherein MDF represents dimethylformamide.

Examples of operational methods are given hereafter:
Step 1.1: Synthesis of

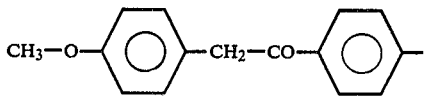

C₅H₁₁ (4-methoxy-4'-pentyl-deoxybenzoine):
350 ml of CH₂Cl₂ and 67 g of Al Cl₃ (0.5 mole) are charged by small fractions into a one-liter reactor. The contents of the reactor are stirred then cooled below 5° C. A mixture containing 45 g of pentylbenzene (about 0.3 mole), 55 g (0.35 mole) of

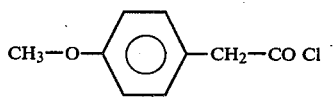

and 250 ml of CH₂ Cl₂ is poured drop by drop, stirring constantly, for an hour and a half. The mixture is then allowed to react at ambient temperature for two hours, and next heated in reflux in order to perfect the reaction for one hour. The mixture is thereupon allowed to cool to ambient temperature, and then poured into a mixture containing 180 g of ice, 180 ml of demineralized water and 180 ml of concentrated H Cl. The liquid is poured off. The aqueous solution is washed twice with chloroform. The organic fractions are placed together and washed with water until neutral. The organic solution is dried on anhydrous Na₂ SO₄, and the solvent is evaporated on a rotary evaporator. The product is recrystallised in 120 ml of ethanol. 56,2 g of product which melts at 62° C. are obtained. The molar efficiency is about 63%.

Step 1.2: synthesis of

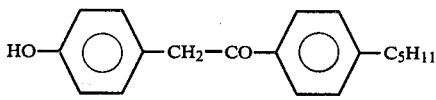

(4-hydroxy-4'-pentyldeoxybenzoine):
9 g (0.03 mole) of

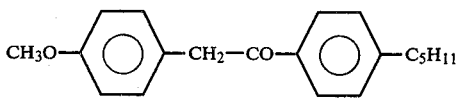

are dissolved in 100 ml of acetic acid, and then 150 ml of 48% of H Br are added. The whole is maintained in reflux for 7 hours. The mixture is allowed to cool to ambient temperature, and then poured into a mixture of 100 g of water and 100 of ice. Stirring is carried out for half an hour. Filtering is carried out, and chromatography is performed on silica with 50%—50% benzenehexane as an eluent 1.2 g of starting product are obtained,
and 5.4 g of desired product which melts at 112° C. The molar efficiency is about 73%.

Step 1.3: synthesis of

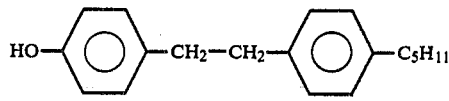

1-(4-hydroxyphenyl) 2-(4'-pentylphenyl) ethane:
3 g of hydrazine, 10 ml of diethylene glycol and 4 g of KOH are charged into a 100 ml Erlenmeyer flask. 4.5 g (0.016 mole) of:

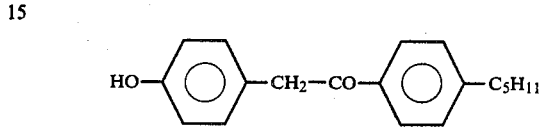

are then added.

The mixture is heated in reflux for an hour by means of a Deah and Stark apparatus and a cooler. Approximately 3 ml of solvent are distilled, and the temperature is kept at 230° C. for 3 hours. After cooling, the mixture is neutralised with a solution of 5 ml of concentrated H Cl in 50 ml of cold water. Stirring is carried out for half an hour; the organic fraction is then extracted with 150 ml of benzene. Said organic fraction is dried on anhydrous Na₂ SO₄, the solvent is evaporated, and chromatography is performed on silica with the benzene as eluent. 2.7 g of product which melts at 102° C. are obtained. The molar efficiency is 63%.

Step 2.1: synthesis of 3-bromo 4-octyloxy benzoic acid

In 180 ml of demineralized water are suspended 37.5 g (0.15 mole) of p-octyloxy benzoic acid. The temperature is kept between 50° C. and 55° C. whilst 8.7 ml (0.17 mole) of bromine are added over a period of time of 7 hours 30 minutes. The product is then filtered, washed with deionized water then recrystallized in ethanol. 37.5 g of product which melts at 110° C. are obtained. Step (c) of esterification: synthesis of $$C_8H_{17}O-\bigcirc\overset{Br}{-}COO-\bigcirc-CH_2-CH_2-\bigcirc-C_5H_{11}$$

540 mg (≃0.002 mole) of

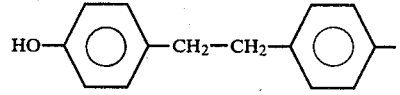

C₅H₁₁ and 700 mg (≃0.002 mole) of 3-bromo-4 octyloxybenzoic acid chloride are charged in a reactor containing 10 ml of pyridine and kept at ambient temperature for 48 hours. The reaction mixture is then poured into a solution containing 10 ml of concentrated H₂SO₄ and 100 g of ice. The organic fraction is extracted three times with ether then washed three times with water and finally dried on anhydrous Na₂SO₄. The solvent is evaporated and the product is recrystallised three times in ethanol. 850 ml of product are obtained. The molar efficiency is 73%.

Step (d) of substituting the cyanide group for the bromine group

Case of $R_1=C_8H_{17}$
Synthesis of

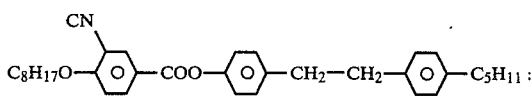

The following are successively charged into an Erlenmeyer flask: 0.24 g ($\simeq$0.0027 mole) of Cu CN, 1.5 ml of dimethylformamide (DMF) and 0.8 g (0.014 mole) of 1,3'bromo (4'-octyloxybenzoyloxy) phenyl-2-(pentylphenyl) ethane. The whole is brought to 160° C. fot six hours while stirring briskly. The mixture is then allowed to cool to ambient temperature. It is poured into a solution of 0.7 g of ethylene diamine in 10 ml of water. It is stirred again for an hour. Benzene is poured into the solution in order to dissolve and extract the cyano product. Filtering is carried out on infusorial earth. The liquid is poured off. The aqueous fraction is washed with benzene. The organic fractions are placed together. They are washed with water until neutral. Drying is carried out on anhydrous $Na_2SO_4$. The solvent is evaporated, and chromatography is performed on a column with the mixture of 50% benzene and 50% hexane as an eluent. The product obtained is recrystalised in this mixture of solvents. 450 mg of product are obtained. The molar efficiency is 62%.

Mesomorphic properties of the materials according to the invention

Table I gives the properties of materials wherein:
$R_1=C_nH_{2n+1}O$ $R_2=C_5H_{11}$ and $X=Br$.

The temperatures appearing in the table are expressed in degrees Celsius.

TABLE I

| n | \multicolumn{4}{c}{TEMPERATURES} | | | |
|---|---|---|---|---|
| | K | $S_C$ | N | I |
| 1 | . | 113 | — | . | (80) | . |
| 2 | . | 102 | — | . | (96) | . |
| 4 | . | 84 | — | . | 93 | . |
| 7 | . | 75 | — | (55) | . | 90 | . |
| 8 | . | 61 | — | (59) | . | 91,5 | . |

The legend of the signs used in this table and in the following one is as follows:
K: crystalline phase
S: smectic (s) phase (s) $S_A$, $S_B$, $S_C$: smectic phases A, B, C
N: nematic phase
I: isotropic liquid phase
.: phase exists
-: phase does not exist
Table I gives the properties of materials wherein:
$R_1=C_n H_{2n+1}O$ $R_2=C_5H_{11}$ and $X=CN$.

TABLE II

| n | K | $S_A$ | N | I |
|---|---|---|---|---|
| 1 | . | 111,5 | — | — | . |
| 2 | . | 78 | . | (72) | . | 90,5 | . |
| 4 | . | 91,5 | . | 97,5 | — | . |
| 7 | . | 71 | . | 105 | — | . |
| 8 | . | 65 | . | 108 | — | . |

In this table, as in the following ones, the temperatures indicated in brackets correspond to metastable transitions.

Properties of materials according to the invention

Hereinafter are given the so-called "parallel" ($\epsilon_\parallel$) and "perpendicular" ($\epsilon_\perp$) dielectric constants, as well as their difference, of the following products:
$A_1$:

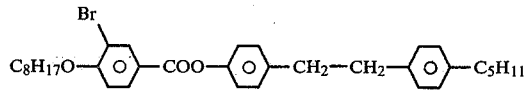

B: paramethoxy benzoate of parapentylphenol
M: a mixture containing 9/10 in moles of the substance B and 1.10 in moles of the substance $A_1$ or $A_2$:

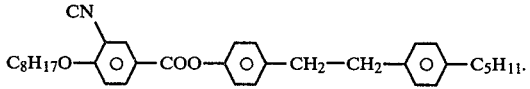

Table III gives the constants $\epsilon_\parallel$ and $\epsilon_\perp$, as well as their difference ($\epsilon_\parallel - \epsilon_\perp$) or dielectric anisotropy $\epsilon_a$. The measurements are taken in an orientating magnetic field of 10,000 oersteds. The measurement frequency is N (KHz).

TABLE III

| PRODUCT | N(KHz) | $\epsilon_\parallel$ | $\epsilon_\perp$ | $\epsilon_a$ |
|---|---|---|---|---|
| | 1 | 3,54 | 4,68 | −1,14 |
| Compound $A_1$ | 10 | 3,50 | 4,67 | −1,17 |
| (at 70° C.) | 100 | 3,32 | 4,65 | −1,33 |
| | 1000 | 3,28 | 4,80 | −1,52 |
| Compound B (at 25° C.) | 10 | 5,7 | 5,6 | +0,1 |
| Mixture M (at 25° C.) | 10 | 4,9 | 5,6 | −0,7 |

As concerns the dielectric anisotropy of a pure product such as $A_1$ (or $A_2$), it is possible to deduce the same by way of calculation, taking in account the results of Table III hereabove.

A good approximation of the dielectric anisotropy for $A_1$ is about: -6.

The results are similar if $A_2$ is substituted for $A_1$.

What we claim is:

1. Liquid crystal materials of the formula:

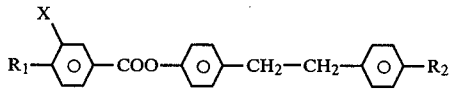

wherein $R_1$ represents an alkoxy group having n carbon atoms (n being an integer from 1 to 10), $R_2$ represents an alkyl group having m carbon atoms (m being an integer from 1 to 10) and X represents bromine or the cyanide group.

2. Liquid crystal materials according to claim 1, wherein:
$R_1=C_8H_{17}O$
$R_2=C_5H_{11}$
$X=Br$.

3. Liquid crystal materials according to claim 1, wherein:
$R_1=C_8H_{17}O$
$R_2=C_5H_{11}$
$X=CN$.

4. A liquid crystal mixture which comprises a material of the formula of claim 1 and the para-methoxybenzoate of parapentyl phenol.

5. A liquid crystal mixture according to claim 4 wherein said material represents 10 percent in moles of said mixture.

* * * * *